US012805448B2

(12) United States Patent
Frascella

(10) Patent No.: US 12,805,448 B2
(45) Date of Patent: Nov. 24, 2026

(54) CONSTANT POWER ROTOR FOR AN AGRICULTURAL BALER

(71) Applicant: KVERNELAND GROUP RAVENNA S.R.L., Russi (IT)

(72) Inventor: Cosimo Frascella, Lugo (IT)

(73) Assignee: KVERNELAND GROUP RAVENNA S.R.L., Russi (IT)

( * ) Notice: Subject to any disclaimer, the term of this patent is extended or adjusted under 35 U.S.C. 154(b) by 315 days.

(21) Appl. No.: 18/563,868

(22) PCT Filed: Jul. 11, 2022

(86) PCT No.: PCT/IB2022/056389
§ 371 (c)(1),
(2) Date: Nov. 22, 2023

(87) PCT Pub. No.: WO2023/285946
PCT Pub. Date: Jan. 19, 2023

(65) Prior Publication Data
US 2024/0224879 A1 Jul. 11, 2024

(30) Foreign Application Priority Data
Jul. 13, 2021 (IT) ........................ 102021000018395

(51) Int. Cl.
*A01F 15/10* (2006.01)
*A01D 90/04* (2006.01)
*A01F 29/04* (2006.01)

(52) U.S. Cl.
CPC ............ *A01F 15/106* (2013.01); *A01D 90/04* (2013.01); *A01F 29/04* (2013.01)

(58) Field of Classification Search
CPC ........ A01F 15/106; A01F 29/04; A01D 90/04
See application file for complete search history.

(56) References Cited

U.S. PATENT DOCUMENTS 6,595,123 B2 * 7/2003 Schrag .................. A01F 15/101 56/504
6,679,041 B2 * 1/2004 Viaud ..................... A01F 15/10 56/341
(Continued)

FOREIGN PATENT DOCUMENTS

DE 202014003763 7/2015
EP 2220929 8/2010
(Continued)

OTHER PUBLICATIONS

International Search Report and Written Opinion dated Sep. 26, 2022 in International Application No. PCT/IB2022/056389.

*Primary Examiner* — Arpad Fabian-Kovacs
(74) *Attorney, Agent, or Firm* — Wentsler LLC

(57) ABSTRACT

A rotor apparatus for an agricultural machine which includes a pick-up apparatus for picking up hay from the ground and a chamber for receiving the picked-up hay, is configured to feed the hay picked-up from the ground to the compression chamber. The rotor apparatus comprises: a rotary shaft, a plurality of feeding blades pairs, each having a plurality of fins distributed on an outer perimeter of the respective blade, wherein the feeding blades pairs are arranged on the rotary shaft in a way that, for each pair of feeding blades, the fins are offset from the corresponding fins of an adjacent pair of feeding blades, so that, for each pair of feeding blades, each fin is misaligned with any other fin of the other pairs of feeding blades.

19 Claims, 2 Drawing Sheets

(56) References Cited

U.S. PATENT DOCUMENTS

| | | | | |
|---|---|---|---|---|
| 6,874,311 | B2 * | 4/2005 | Lucand | A01F 15/106<br>56/364 |
| 7,694,504 | B1 * | 4/2010 | Viaud | A01F 15/106<br>56/341 |
| 8,205,424 | B1 * | 6/2012 | Lang | A01F 29/02<br>56/341 |
| 9,144,200 | B2 * | 9/2015 | Chaney | A01D 90/04 |
| 9,468,149 | B2 * | 10/2016 | Derscheid | A01F 29/04 |
| 9,549,506 | B2 * | 1/2017 | McClure | A01F 15/106 |
| 9,839,181 | B2 * | 12/2017 | Singh | A01F 15/07 |
| 10,524,424 | B2 | 1/2020 | Seo | |
| 10,537,068 | B2 * | 1/2020 | Ravaglia | A01F 15/07 |
| 11,564,354 | B2 * | 1/2023 | Rosseel | A01D 90/04 |
| 11,632,911 | B2 * | 4/2023 | De Baere | A01F 15/10<br>241/32 |
| 12,336,453 | B2 * | 6/2025 | Shenk | A01F 29/095 |
| 2010/0229520 | A1 * | 9/2010 | Lauwers | A01D 90/04<br>56/294 |
| 2011/0023440 | A1 * | 2/2011 | Matousek | A01D 43/06<br>56/341 |
| 2013/0167497 | A1 * | 7/2013 | Van De Weijer | A01D 90/04<br>56/341 |
| 2017/0105355 | A1 * | 4/2017 | Rosseel | A01F 15/042 |
| 2018/0220585 | A1 * | 8/2018 | Seo | A01F 15/106 |
| 2020/0170191 | A1 * | 6/2020 | Devroe | A01F 15/101 |
| 2020/0359567 | A1 * | 11/2020 | Shonk | A01F 15/10 |

FOREIGN PATENT DOCUMENTS

| | | | | | |
|---|---|---|---|---|---|
| EP | 3275303 | | | 1/2018 | |
| EP | 3666061 | A2 | * | 6/2020 | A01F 15/106 |
| GB | 1458786 | | | 12/1976 | |
| IE | 20150124 | | | 2/2016 | |
| KR | 20130068216 | A | * | 6/2013 | A01F 15/07 |
| WO | WO-2012167219 | A2 | * | 12/2012 | A01F 15/10 |

* cited by examiner

CONSTANT POWER ROTOR FOR AN AGRICULTURAL BALER

TECHNICAL FIELD

This invention relates to a rotor apparatus for an agricultural machine provided with a pick-up apparatus for picking up hay from the ground.

BACKGROUND ART

Agricultural machines provided with a pick-up apparatus for picking up hay from the ground include loader wagons, which include a receiving chamber for storing and transporting hay, and balers, the balers being configured to form a bale out of previously cut agricultural products such as rice straw, grass, wheat, maize, and the like (hereinafter referred to as “hay”) and discharge it onto the field, wherein the rotor apparatus is configured to feed the hay picked-up from the ground to a compression chamber of the baler in order to form bales.

Among various types of conventional hay collecting apparatus, agricultural machines including a baler connected to the rear part of the machine are mainly used for automatic collection of hay on paddy fields or grass fields. While these machines operate, hay is collected by a pick-up apparatus located on the front of the machine. The picked-up hay is later fed to a compression and binding chamber of the machine via a rotor apparatus and the bale is finally discharged onto the field. Usually, the hay is cut to a predetermined length by a cutter installed at a lower portion of the rotor apparatus.

Conventionally the rotor apparatus for the balers, includes a cylindrical rotary shaft with a plurality of blades mounted in spaced and parallel with each other along a length of the cylindrical rotary shaft, arranged equal-angularly about a rotation axis of the rotary shaft.

A drawback of the conventional arrangement of the blades on the rotary shaft is that the plurality of blades arranged at the same position, simultaneously feed the hay of the pick-up apparatus to pass the hay through the cutter. As a result, a high load is more likely to be applied to the rotary shaft than when the blades feed the hay sequentially one by one.

Applying the load to the rotary shaft as described above, can lead to deformation of the rotary shaft.

U.S. Pat. No. 10,524,424B2 discloses a rotor apparatus for a baler, comprising a rotary shaft wherein a plurality of feeding blades each including a plurality of sharp tips are arranged on the rotary shaft, such that the tips of the plurality of the feeding blades are offset from each other with respect to a lengthwise direction of the rotary shaft. In this solution, all feeding blades are not involved in the process of feeding the hay simultaneously, therefore it is possible to reduce the load on the rotary shaft.

Although the rotary shaft described by the U.S. Pat. No. 10,524,424B2, provides a solution to reduce the load applied on the rotary shaft by arranging the tips of the blades offset from each other, it does not provide any further information on arranging the blades such that the tips of each feeding blade is misaligned with any other tip of the other feeding blades. It is therefore desired to make a rotor apparatus for a baler with an extended service life, which is capable of feeding the hay in a more quick and precise way, while keeping the load applied to the rotary shaft as low as possible.

Further examples of known rotor apparatuses for agricultural machines are disclosed in patent documents GB1458786A, EP2220929A1, EP3275303A1, DE202014003763U1.

DISCLOSURE OF THE INVENTION

The main object of the present invention is that of providing a rotor apparatus for a baler and a method for feeding hay picked-up from the ground to a compression chamber of the baler that overcomes the aforementioned problems.

The object of this invention is providing a rotor apparatus for an agricultural machine (particularly a baler or a loader wagon), and a method for feeding hay to a chamber of the agricultural machine (e.g. the receiving chamber of the loader wagon or the compression chamber of the baler), capable of feeding hay picked-up by a pick-up apparatus to a compression and binding chamber of the baler as quick and efficiently as possible, such that during the process of feeding, one feeding blade at the time is active on the hay in order to minimize the load applied on the shaft.

Another object of this invention is providing an agricultural machine (such as a baler apparatus or a loader wagon), configured such that hay is picked up from the ground by a hay pick-up apparatus, is cut to a predetermined length and is fed to a chamber of the agricultural machine (e.g. a compression chamber of the baler or a receiving chamber pf the loader wagon) by the rotor apparatus according to the present invention.

Said objects are fully achieved by the rotor apparatus, the method for feeding hay and the baler of the present invention, which are characterized by the contents of the claims reported below.

According to an aspect of the present description, the present invention provides a rotor apparatus for an agricultural machine. In the present description, with the expression “agricultural machine” we mean any agricultural machine provided with a pick-up apparatus for picking up hay from the ground. Typically, agricultural machines of these typology include loader wagons (which are provided with a receiving chamber for storing and transporting hay) and balers. For the sake of brevity, in the following reference is made to a baler, but it is to be understood that the same features described about the baler apply also to e.g. a loader wagon, mutatis mutandis.

The baler includes a pick-up apparatus for picking up hay from the ground and a compression chamber for compressing the hay to form a bale. The rotor apparatus is configured to feed the hay picked-up from the ground to the compression chamber. The rotor apparatus comprises a rotary shaft. The rotary shaft includes a first and a second end. The rotary shaft may extend along a longitudinal axis between its first and second end. The rotor apparatus comprises a plurality of feeding blades. The feeding blades are coupled to the rotary shaft between the first and the second end. Each feeding blade of the plurality of the feeding blades includes a plurality of fins. The plurality of fins allows to feed the hay to the compression chamber in a more quick and more efficient way. The plurality of fins is distributed on an outer perimeter of the feeding blades. The plurality of the feeding blades may include pairs of feeding blades. Preferably each pair of feeding blades of the plurality of the feeding blades includes two blades facing each other and having a space therebetween. Moreover, the fins of each pair of feeding blades are longitudinally aligned with each other.

The fins of each pair of feeding blades are offset from the corresponding fins of an adjacent pair of feeding blades with respect to a longitudinal direction of the rotary shaft. The pairs of feeding blades are distributed on the rotary shaft, such that for each pair of feeding blades of the plurality of feeding blades, each fin is misaligned with any other fin of the other pairs of feeding blades. Such arrangement allows a sequential involvement of the pairs of feeding blades in the process of feeding the hay to the compression chamber.

In case the fins of pairs of feeding blades are not misaligned with each other with respect to the longitudinal direction of the rotary shaft, at least two feeding blades pairs are involved in the process of feeding the hay simultaneously. Consequently, a greater load is applied to the rotary shaft than when the fins of the blades are offset with respect to each other, according to the arrangement explained in the present description. Applying the load to the rotary shaft should be avoided, as it may lead to deformation of the rotary shaft. Furthermore, the curve obtained for the power required by the rotor apparatus is of the oscillating type (sinusoidal wave) with peaks which are determined by the sum of the power required by each feeding blades pair involved in the feeding process.

When the fins of each pair of feeding blades are offset from the corresponding fins of an adjacent pair of feeding blades, it is possible for the feeding blades pairs to contact the hay sequentially and one by one, so that the power required by the apparatus is distributed along the rotary shaft. Moreover, the power required by the apparatus is lowered due to the fact that the feeding blades do not work simultaneously. The rotor apparatus with fins offset from each other allows to reduce the amplitude of the oscillation curve. As a result, it is possible to have greater constancy in the power required by the apparatus with a reduction in the peak of the power demand, which is due to the simultaneous involvement of the feeding blades. Such arrangement of the feeding blades minimizes the load applied to the rotary shaft due to the feeding of the hay to pass through the plurality of cutters and therefore protects the rotary shaft and extends its service life.

The plurality of feeding blades may include a first group of feeding blades pairs and a second group of feeding blades pairs. The first group of feeding blades pairs is located between the first end of the rotary shaft and a mid-point of the rotary shaft. The second group of feeding blades pairs is located between the mid-point and the second end of the rotary shaft. In an example, the fins of each pair of feeding blades of the first group are offset by a first predetermined angle from the corresponding fins of the adjacent pair of feeding blades.

The fins of each pair of feeding blades of the second group are offset by the first predetermined angle from the corresponding fins of the adjacent pair of feeding blades. The fins of each pair of feeding blades of the first group are offset by a second predetermined angle from the corresponding fins of a corresponding pair of feeding blades of the second group. Said second predetermined angle is preferably half of the first predetermined angle.

The feeding blades of the first and the second group of feeding blades may be distributed on the rotary shaft from a first feeding blades pair, proximal to the first or second end of the rotary shaft, respectively, and a last feeding blades pair, proximal to the mid-point of the rotary shaft. In such arrangement the first feeding blades pair of the first group of feeding blades pairs corresponds to first feeding blades pair of the second group of feeding blades pairs, and likewise for the other feeding blades couples of each group.

The feeding blades pairs may be distributed on the rotary shaft such that the pairs of feeding blades of the first group are offset from each other in a clockwise direction with respect to the longitudinal axis, from the first end to the mid-point of the rotary shaft and the pairs of feeding blades of the second group are offset from each other in a counterclockwise direction with respect to the longitudinal axis, from the mid-point to the second end of the rotary shaft.

The rotary shaft may include a hollow pipe. The rotary shaft may also include a power input shaft. The power input shaft is located at a first end of the hollow pipe. The power input shaft is connectable to an external power. The power input shaft is configured to rotate the rotary shaft by receiving power from the external power. The rotary shaft may include a power output shaft. The power output shaft is located at a second end of the hollow pipe. The rotary shaft may further include a pair of margin portions. The pair of margin portions may be placed at the first and the second end of the hollow pipe. In one example of embodiment the feeding blades pairs are mounted on said hollow pipe and between the pair of margin portions.

According to another aspect of the present description, the present invention provides a baler for forming bales. The baler comprises a hay pick-up apparatus. The baler comprises a rotor apparatus, wherein the rotor apparatus is according to the present invention. The baler also comprises a plurality of cutters. The cutters may be interposed between the pairs of feeding blades. The baler also comprises a hay compression chamber. The hay is picked up from the ground by the pick-up apparatus and is later fed to the compression chamber via the rotor apparatus.

According to another aspect of the present description, the present invention provides a method for feeding hay picked-up from the ground to a compression chamber of a baler. The method comprises a step of providing a rotary shaft. The method comprises a step of providing a plurality of feeding blades. The method may include providing pairs of feeding blades facing each other and having a space therebetween. A plurality of fins is distributed on an outer perimeter of each feeding blade of the plurality of the feeding blades.

The method comprises a step of coupling the feeding blades pairs to the rotary shaft such that, for each pair of feeding blades, corresponding fins are longitudinally aligned. The method comprises a step of arranging the pairs of feeding blades on the rotary shaft, in a way that for each pair of feeding blades, the fins are offset from the corresponding fins of an adjacent pair of feeding blades, so that, for each pair of feeding blades of the plurality of feeding blades, each fin is misaligned with any other fin of the other pairs of feeding blades.

The method may comprise a step of providing a first group and a second group of feeding blades pairs. The first group of the feeding blades pairs is located between the first end of the rotary shaft and a mid-point of the rotary shaft. The second group of the feeding blades is located between the mid-point of the rotary shaft and the second end of the rotary shaft. The method may further comprise a step of arranging said first and second group of feeding blades pairs on the rotary shaft, such that for each pair of feeding blades of the first and the second group, the fins are offset by a first predetermined angle from the corresponding fins of the adjacent pair of feeding blades, and for each pair of feeding blades of the first group, the fins are offset by a second predetermined angle from the corresponding fins of a corresponding pair of feeding blades of the second group. Said second predetermined angle is preferably half the first predetermined angle.

The method may also comprise a step of arranging the feeding blades pairs in a way that the fins of feeding blades of the first group are offset from the corresponding fins of a corresponding pair of feeding blades of the second group by an angle which is half of the first predetermined angle.

Moreover, the method may comprise a step of distributing the first and the second group of the feeding blades on the rotary shaft from a first feeding blades pair, proximal to the first or the second end of the rotary shaft, respectively, and a last feeding blades pair, proximal to the mid-point of the rotary shaft, in a way that the first feeding blades pair of the first group corresponds to the first feeding blades pair of the second group, and likewise for the other feeding blades couples of each group.

In an example of embodiment, the method comprises a step of distributing the feeding blades pairs on the rotary shaft, such that the pairs of feeding blades of the first group are offset from each other in a clockwise direction with respect to the longitudinal axis, from the first end to the mid-point of the rotary shaft, and the pairs of feeding blades of the second group are offset from each other in a counterclockwise direction with respect to the longitudinal axis, from the mid-point to the second end of the rotary shaft.

The method comprises a step of rotating the rotary shaft. By rotating the rotary shaft, one single pair of feeding blades at the time is active on the hay and contributes to feeding the hay to the compression chamber of the baler.

BRIEF DESCRIPTION OF DRAWINGS

Further characteristics of the present invention will be more clearly comprehensible from the description given below of its preferred and non-limiting embodiments, wherein.

DETAILED DESCRIPTION OF PREFERRED EMBODIMENTS OF THE INVENTION

Figure 1:
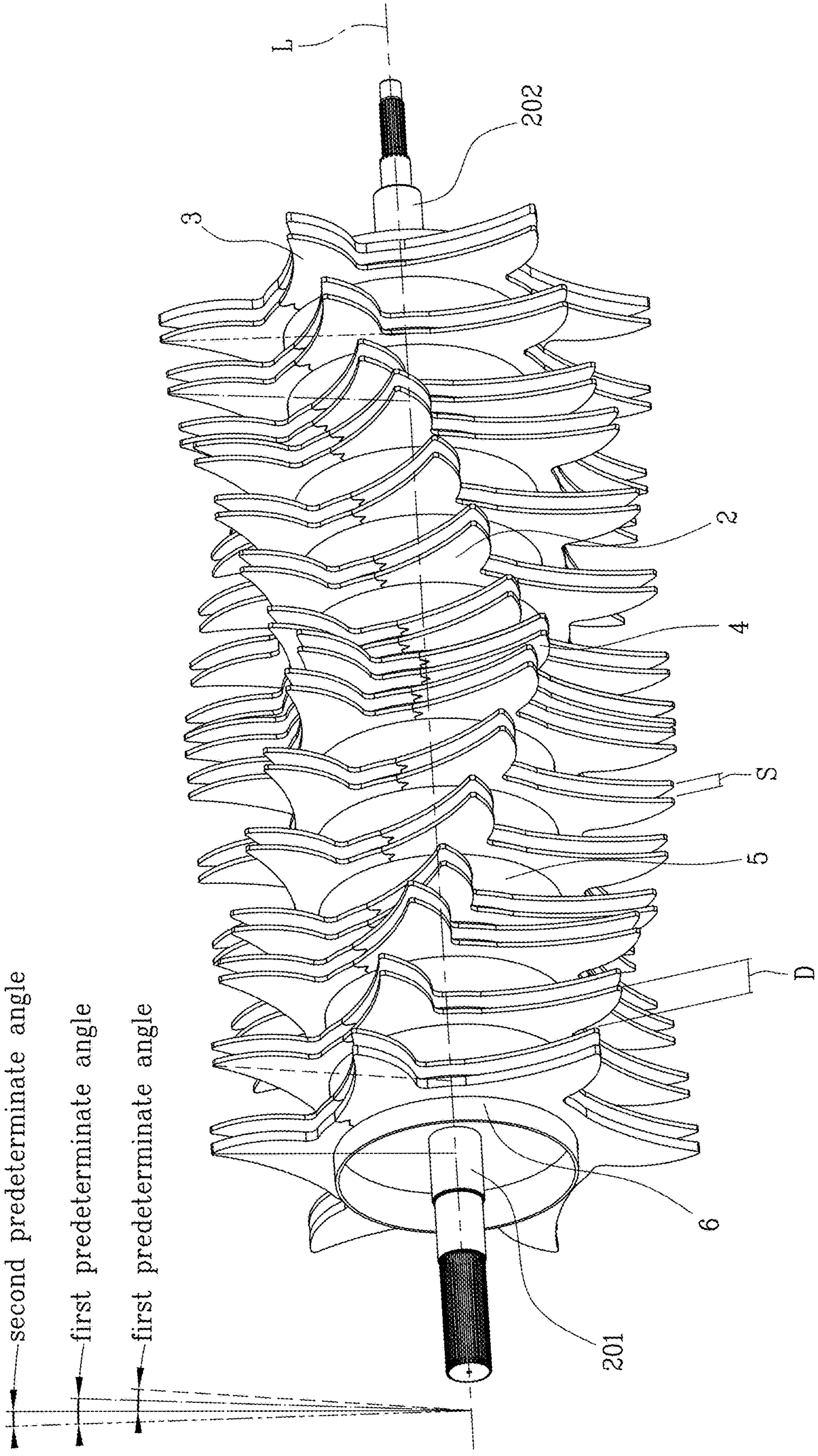
FIG. 1 illustrates a rotor apparatus for a baler according to the present invention.
Figure 2:
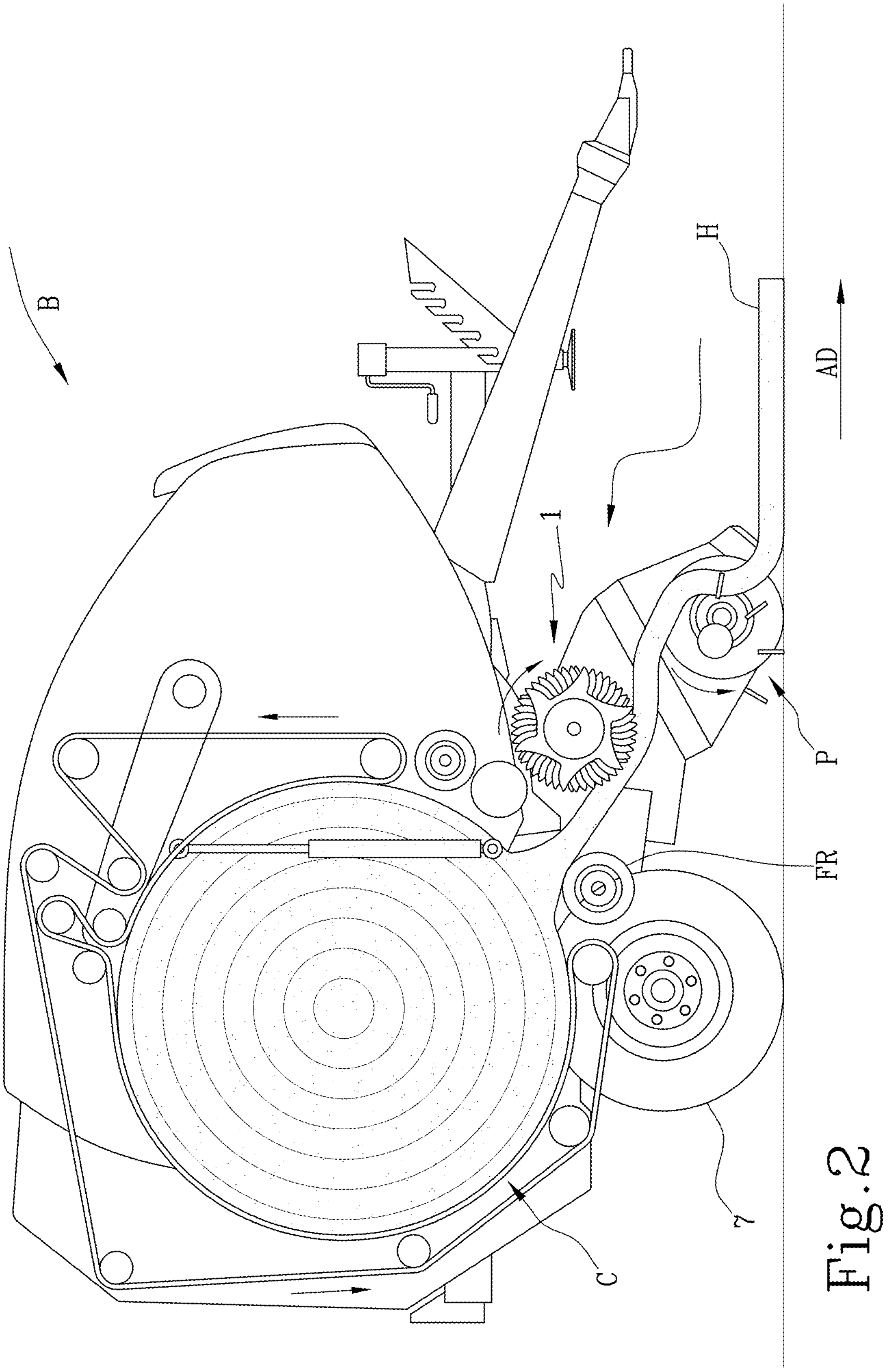
FIG. 2 illustrates a baler of the present invention.

With reference to the aforementioned figures the rotor apparatus for a baler according to the present invention is indicated by number 1. The rotor apparatus 1 is a rotor apparatus for a baler B. The baler B is configured to pick up hay from the ground, form a bale and discharge the bale into the field. The baler B comprises a pick-up apparatus P for picking up hay from the ground. The baler comprises a compression chamber C. The baler B is configured such that, the hay picked up from the ground by the pick-up apparatus P is fed to the compression chamber C by the rotor apparatus 1. The rotor apparatus 1 comprises a rotary shaft. The rotary shaft may extend along a longitudinal axis L, between a first and a second end thereof. The rotary shaft comprises a plurality of feeding blades 2. The plurality of feeding blades includes a plurality of fins 3. Preferably each feeding blade of the plurality of feeding blades 2, includes between two and six fins 3. The plurality of fins 3 are distributed on an outer parameter of the feeding blades 2. The plurality of the feeding blades 2 is coupled to the rotary shaft between the first and the second end of the rotary shaft. The plurality of feeding blades 2 may include pairs of feeding blades 2, facing each other and having a space S therebetween. The pairs of feeding blades 2 may be arranged along a length of the rotary shaft with a distance D therebetween. Said distance D between the pairs of the feeding blades 2, is preferably greater than the space S between the fins of each pair of feeding blades 2 pairs. The feeding blades 2 of each pair of feeding blades 2 have the same size and shape. Preferably for each pair of feeding blades 2, corresponding fins 3 are longitudinally aligned with each other. In an example of embodiment, the pairs of feeding blades 2 have the same size. Alternatively, the pairs of feeding blades can be of different size. The pairs of feeding blades 2 are arranged on the rotary shaft such that, for each pair of feeding blades 2, the fins 3 are offset from the corresponding fins 3 of an adjacent pair of feeding blades 2. In such solution, for each pair of feeding blades 2 of the plurality of feeding blades 2, each fin 3 is misaligned with any other fin 3 of the other pairs of feeding blades 2. In other words, the pairs of feeding blades 2 are arranged on the rotary shaft in a way that the fins 3 of each pair of feeding blades are arranged with a predetermined angular position with respect to the rotary shaft, so that the angular position of the fins of each pair of feeding blades with respect to the rotary shaft is unique and is different from the angular position of the fins of other pairs of feeding blades. Therefore, for N pairs of fins, there are N different angles with respect to the rotary shaft. Therefore, the fins 3 are arranged in a way that only one single pair of fins of feeding blades at a time is active on the hay.

In a preferred embodiment, the rotor apparatus includes a first group and a second group of feeding blades 2 pairs. The first group of the feeding blades 2 pairs is located between the first end of the rotary shaft and a mid-point 4 of the rotary shaft. The second group of the feeding blade 2 pairs is located between the second end of the rotary shaft and the mid-point 4 of the rotary shaft. The mid-point 4 may be placed on the middle of the rotary shaft, dividing the rotary shaft into two halves. In an example, for each pair of feeding blades 2 of the first group of the feeding blades 2 pairs, the fins 3 are offset by a first predetermined angle from the corresponding fins 3 of the adjacent pair of feeding blades 2.

For each pair of feeding blades 2 of the second group of the feeding blades 2 pairs, the fins 3 are offset by said first predetermined angle from the corresponding fins 3 of the adjacent pair of feeding blades 2. Moreover, for each pair of feeding blades 2 of the first group of the feeding blades 2 pairs, the fins 3 are offset by a second predetermined angle from the corresponding fins 3 of a corresponding pair of feeding blades 2 of the second group of the feeding blades 2 pairs. The second predetermined angle is different from the first predetermined angle. The second predetermined angle is preferably smaller than the first predetermined angle. In a preferred embodiment, the second predetermined angle is half the first predetermined angle.

The rotor apparatus 1 may include the same number of feeding blades 2 pairs on the first and the second group of the feeding blades 2 pairs. The feeding blades 2 pairs of the first and the second group of feeding blades 2 pairs may be distributed on the rotary shaft from a first feeding blades 2 pairs proximal to the first or the second end of the rotary shaft and a last feeding blades 2 pair, proximal to the mid-point. In such arrangement, the first feeding blades 2 pair of the first group of the feeding blades 2 pairs corresponds to the first feeding blades 2 pair of the second group of the feeding blades 2 pairs, and likewise for the other feeding blades 2 couples of each group.

The first and the second group of the feeding blades 2 pairs may be distributed on the rotary shaft, such that the pairs of feeding blades 2 of the first group are offset from each other in a clockwise direction with respect to the longitudinal axis L, from the first end to the mid-point 4 of the rotary shaft, and the pairs of feeding blades 2 of the second group are offset from each other in a counterclockwise direction with respect to the longitudinal axis L, from the mid-point 4 to the second end of the rotary shaft. In one example of embodiment, the feeding blades 2 pairs of the first and the second group are distributed in a way that, the feeding blades 2 pairs form a V shape on the rotary shaft.

The rotor apparatus 1 may comprise a hollow pipe 5. The rotor apparatus 1 may also comprise a power input shaft 201 and a power output shaft 202 at a first and a second end of the hollow pipe 5, respectively. The power input shaft 201 is connectable to an external power and is configured to rotate the rotor apparatus 1. Said external power may be a power source mounted on the baler B. The rotor apparatus 1 may include a pair of margin portions 6. The margin portions 6 are located at the first and the second end of the hollow pipe 5. The feeding blades 2 pairs may be distributed on the hollow pipe 5 and between said pair of margin portions 6. Moreover, the rotor apparatus 1 may have a convergent or divergent or differentiated profile.

According to an aspect of the present description, the present invention also provides a baler B for forming bales. The baler B is preferably a round baler. Alternatively, the baler B is of the rectangular type. The baler B comprises a hay pick-up apparatus P. The hay pick-up apparatus P is configured to pick up the hay from the ground. The baler comprises a rotor apparatus, wherein said rotor apparatus is according to the present invention. The baler B also comprises a plurality of cutters. The cutters may be interposed between pairs of feeding blades 2 of the rotor apparatus 1. The cutters are configured to cut the picked-up hay to a predetermined length. The baler B also comprises a hay compression chamber C, configured to compress and bind the picked-up hay. The baler B is configured such that, the hay picked-up from the ground by the pick-up apparatus P and is passed through the cutters to be cut to a desired length. The hay is later fed to the compression chamber C via the rotor apparatus 1. The compression chamber C is configured to compress and bind the hay. The bale is later discharged to the ground by the baler B.

In an example, the baler includes a feeding roller FR. The feeding roller is placed downstream of the rotor 1. The feeding roller FR is configured to push the hay towards the compression chamber C in order to contribute to the feeding of the hay to the compression chamber. The feeding roller rotates in an opposite direction with respect to the rotation direction of the wheels 7 of the baler when the baler advances along a direction of travel (advancing direction) AD.

Moreover, the pick-up apparatus P rotates in a direction opposite to the direction of travel of the baler AD. In an example, the rotor 1 rotates in an opposite direction with respect to rotation direction of the pick-up apparatus. Therefore, in such a configuration, the rotor rotates in a direction similar to the rotation direction of the wheels 7 of the baler when the baler advances along said direction of travel AD. Therefore, the hay which is picked from the ground is passed between the pick-up apparatus and the rotor and then between the rotor and the feeding roller FR to enter the compression chamber.

According to an aspect of the present description, the present invention also provides a method for feeding hay picked-up from the ground to a compression chamber C of a baler B. The method comprises a step of providing a rotary shaft. The rotary shaft extends along a longitudinal axis L between a first end and a second end. The method also comprises a step of providing a plurality of feeding blades 2. The method may comprise a step of providing a hollow pipe 5. The method may also comprise a step of providing a power input shaft 201 and a power output shaft 202 at a first end and a second end of the hollow pipe 5, respectively. The method may comprise a step of providing the rotary shaft with a pair of margin portions 6. The margin portions 6 are placed at the first and the second end of the hollow pipe 5. In an example of embodiment, the method comprises a step of arranging the plurality of feeding blades on the hollow pipe 5 and between said pair of margin portions 6.

The method may comprise a step of providing the plurality of feeding blades 2 with pairs of feeding blades 2 facing each other and having a space S therebetween. A plurality of fins 3 are distributed on an outer perimeter of each feeding blade of the pairs of feeding blades 2. The method comprises a step of coupling the plurality of feeding blades 2 to the rotary shaft between the first and the second end thereof, in way that for each pair of feeding blades 2, corresponding fins 3 are longitudinally aligned. The method further comprises a step of arranging the pairs of feeding blades 2 on the rotary shaft, such that, for each pair of feeding blades 2, each fin 3 is offset from the corresponding fin of the adjacent pair of feeding blades 2. The feeding blades 2 pairs are distributed on the rotary shaft in a way that for each pair of feeding blades 2 of the plurality of feeding blades 2, each fin is misaligned with any other fin 3 of the other pairs of feeding blades 2.

The method may comprise a step of providing a first and a second group of feeding blades 2 pairs, wherein the first group of feeding blades 2 pairs is located between the first end of the rotary shaft and a mid-point 4 of the rotary shaft, and the second group of feeding blades 2 pairs is located between the second end of the rotary shaft and said mid-point 4 of the rotary shaft. The method may comprise a step of arranging the feeding blades 2 pairs of said first and second groups of feeding blades 2 in a way that, for each pair of feeding blades 2 of the first and the second group, the fins 3 are offset by a first predetermined angle from the corresponding fins 3 of the adjacent pair of feeding blades 2, and for each pair of feeding blades 2 of the first group, the fins 3 are offset by a second predetermined angle from the corresponding fins 3 of a corresponding pair of feeding blades 2 of the second group. The method may comprise a step of arranging the feeding blades 2 of the first and second group of feeding blades 2 such that, the fins 3 of feeding blades 2 of the first group are offset from the corresponding fins 3 of a corresponding pair of feeding blades 2 of the second group by an angle which is smaller than the first predetermined angle. Moreover, the second predetermined angle is preferably half of the first predetermined angle.

In an example, said first and second group of feeding blades 2 pairs include the same number of feeding blades 2 pairs. The method may comprise a step of distributing the feeding blades 2 pairs from a first feeding blades 2 pair, proximal to the first or second end of the rotary shaft, respectively, and a last feeding blades 2 pair, proximal to the mid-point 4 of the rotary shaft, such that the first feeding blades 2 pair of the first group corresponds to the first feeding blades 2 pair of the second group, and likewise for the other feeding blades 2 couples of each group.

In an example of embodiment, the method comprises a step of distributing the plurality of feeding blades 2 on the rotary shaft, in a way that the pairs of feeding blades 2 of the first group are offset from each other in a clockwise direction with respect to the longitudinal axis L, from the first end to the mid-point 4 of the rotary shaft, and the pairs of feeding blades 2 of the second group are offset from each other in a counterclockwise direction with respect to the longitudinal axis L, from the mid-point 4 to the second end of the rotary shaft. In such example the feeding blades 2 pairs of the first and second group form a V shape.

The method comprises a step of rotating the rotary shaft, so that one single pair of feeding blades 2 at the time is active on the hay and the feeding blades pairs 2 feed the hay to pass through the cutters one by one.

The invention claimed is:

1. A rotor apparatus for an agricultural machine including a pick-up apparatus for picking up hay from the ground, the agricultural machine being a loader wagon or a baler, the baler further including a compression chamber for compressing the hay to form a bale, wherein the rotor apparatus is configured to feed the hay picked-up from the ground to the compression chamber and comprises:

a rotary shaft, extending along a longitudinal axis between a first end and a second end;

a plurality of feeding blade, each having a plurality of fins distributed on an outer perimeter of the respective blade, the plurality of feeding blades being coupled to the rotary shaft between the first and the second end thereof, the plurality of feeding blades including pairs of feeding blades facing each other and having a space therebetween, wherein, for each pair of feeding blades, corresponding fins are longitudinally aligned, wherein, for each pair of feeding blades, the fins are offset from the corresponding fins of any adjacent pairs of feeding blades, so that, for each pair of feeding blades of the plurality of feeding blades, the fins are misaligned with all the other fins of the other pairs of feeding blades, wherein the plurality of feeding blades includes: a first group of feeding blades pairs located between the first end of the rotary shaft and a mid-point of the rotary shaft; and a second group of feeding blades pairs located between the second end of the rotary shaft and the mid-point of the rotary shaft, wherein, for each pair of feeding blades of the first group, the fins are offset by a first predetermined angle from the corresponding fins of the adjacent pairs of feeding blades, wherein, for each pair of feeding blades of the second group, the fins are offset by the first predetermined angle from the corresponding fins of the adjacent pairs of feeding blades, and wherein, for each pair of feeding blades of the first group, the fins are offset by a second predetermined angle from the corresponding fins of a corresponding pair of feeding blades of the second group, the second predetermined angle being smaller than the first predetermined angle.

2. The rotor apparatus according to claim 1, wherein the second predetermined angle is half the first predetermined angle.

3. The rotor apparatus according to claim 1, wherein the first and the second group of feeding blades pairs include the same number of feeding blades pairs, distributed from a first feeding blades pair, proximal to the first or second end of the rotary shaft, respectively, and a last feeding blades pair, proximal to the mid-point of the rotary shaft, and wherein the first feeding blades pair of the first group corresponds to the first feeding blades pair of the second group, and likewise for the other feeding blades couples of each group.

4. The rotor apparatus according to claim 3, wherein the pairs of feeding blades of the first group are offset from each other in a clockwise direction with respect to the longitudinal axis, from the first end to the mid-point of the rotary shaft, and the pairs of feeding blades of the second group are offset from each other in a counterclockwise direction with respect to the longitudinal axis, from the mid-point to the second end of the rotary shaft.

5. The rotor apparatus according to claim 1, wherein each feeding blade of the pairs of feeding blades includes between two and six fins.

6. The rotor apparatus according to claim 1, wherein the rotary shaft includes:

a hollow pipe;

a power input shaft, provided at a first end of the hollow pipe, the power input shaft being connectable to an external power to rotate the rotor apparatus; and a power output shaft, provided at a second end of the hollow pipe, wherein the plurality of blades is arranged on the hollow pipe.

7. The rotor apparatus according to claim 6, wherein the rotary shaft includes a pair of margin portions placed at the first and the second end of the hollow pipe, and wherein the plurality of blades is arranged between said pair of margin portions.

8. The rotor apparatus according to claim 1, wherein the pairs of feeding blades are arranged along a length of the rotary shaft with a distance therebetween, the distance between the pairs of the feeding blades being greater than the space between the fins of each pair of feeding blades pairs.

9. The rotor apparatus according to claim 1, wherein the feeding blades of each pair of feeding blades have the same size and shape.

10. The rotor apparatus according to claim 1, wherein the rotor apparatus has a convergent profile.

11. The rotor apparatus according to claim 1, wherein the feeding blades pairs of the first and the second group are distributed in a way that, the feeding blades pairs form a V shape on the rotary shaft.

12. The rotor apparatus according to claim 1, wherein each feeding blade of the pairs of feeding blades includes six fins.

13. A baler for forming bales, comprising:

a hay pick-up apparatus;

a rotor apparatus;

a plurality of cutters operatively interposed between the pair of feeding blades to cut the picked-up hay;

a hay compressing apparatus;

wherein the baler is configured such that hay is picked up from the ground by the hay pick-up apparatus, the picked-up hay is fed to a region of a hay compressing apparatus by the rotor apparatus wherein the rotor apparatus is configured to feed the hay picked-up from the ground to a compression chamber of the baler and comprises: a rotary shaft extending along a longitudinal axis between a first end and a second end; and a plurality of feeding blades, each feeding blade having a plurality of fins distributed on an outer perimeter of the respective blade, the plurality of feeding blades being coupled to the rotary shaft between the first and the second end thereof, the plurality of feeding blades including pairs of feeding blades facing each other and having a space therebetween, wherein, for each pair of feeding blades, corresponding fins are longitudinally aligned, wherein, for each pair of feeding blades, the fins are offset from the corresponding fins of an adjacent pair of feeding blades, so that, for each pair of feeding blades of the plurality of feeding blades, each fin is misaligned with any other fin of the other pairs of feeding blades;

wherein the plurality of feeding blades includes: a first group of feeding blades pairs located between the first end of the rotary shaft and a mid-point of the rotary shaft; and a second group of feeding blades pairs located between the second end of the rotary shaft and the mid-point of the rotary shaft, wherein, for each pair of feeding blades of the first group, the fins are offset by a first predetermined angle from the corresponding fins of the adjacent pair of feeding blades, wherein, for each pair of feeding blades of the second group, the fins are offset by the first predetermined angle from the corresponding fins of the adjacent pair of feeding blades, and wherein, for each pair of feeding blades of the first group, the fins are offset by a second predetermined angle from the corresponding fins of a corresponding pair of feeding blades of the second group, the second predetermined angle being smaller than the first predetermined angle.

14. The baler according to claim 13, wherein the hay pick-up apparatus rotates in a direction opposite to the rotation direction of wheels of the baler when the baler advances along a direction of travel and wherein the rotor rotates in an opposite direction with respect to the rotation direction of the pick-up apparatus.

15. A method for feeding hay picked-up from the ground to a chamber of an agricultural machine, the agricultural machine comprising a loader wagon or a baler provided with a compression chamber, the method comprising:

providing a rotary shaft, extending along a longitudinal axis between a first end and a second end;

providing a plurality of feeding blades, including pairs of feeding blades facing each other and having a space therebetween and each pair of feeding blades having a plurality of fins distributed on an outer perimeter of the respective blade, coupling the plurality of feeding blades to the rotary shaft between the first and the second end thereof, such that, for each pair of feeding blades, corresponding fins are longitudinally aligned;

arranging the pairs of feeding blades on the rotary shaft, so that, for each pair of feeding blades, the fins are offset from the fins of any adjacent pairs of feeding blades, so that, for each pair of feeding blades of the plurality of feeding blades, the fins are misaligned with all the other fins of the other pairs of feeding blades;

providing a first group of feeding blades pairs, located between the first end of the rotary shaft and a mid-point of the rotary shaft, and a second group of feeding blades pairs, located between the second end of the rotary shaft and the mid-point of the rotary shaft; and arranging the feeding blades in a way that for each pair of feeding blades of the first and the second group, the fins are offset by a first predetermined angle from the corresponding fins of the adjacent pair of feeding blades, wherein, for each pair of feeding blades of the first group, the fins are offset by a second predetermined angle from the corresponding fins of a corresponding pair of feeding blades of the second group, the second predetermined angle being smaller than the first predetermined angle.

16. The method according to claim 15, wherein each pair of feeding blades of the first group is arranged in a way that the fins of feeding blades of the first group are offset from the corresponding fins of a corresponding pair of feeding blades of the second group by an angle which is half of the first predetermined angle.

17. The method according to claim 15, further comprising providing the first and the second group of feeding blades pairs with the same number of feeding blades pairs, and distributing the feeding blades pairs from a first feeding blades pair, proximal to the first or second end of the rotary shaft, respectively, and a last feeding blades pair, proximal to the mid-point of the rotary shaft, such that the first feeding blades pair of the first group corresponds to the first feeding blades pair of the second group, and likewise for the other feeding blades couples of each group.

18. The method according to claim 17, wherein the plurality of the feeding blades pairs is distributed on the rotary shaft, in a way that the pairs of feeding blades of the first group are offset from each other in a clockwise direction with respect to the longitudinal axis, from the first end to the mid-point of the rotary shaft, and the pairs of feeding blades of the second group are offset from each other in a counterclockwise direction with respect to the longitudinal axis from the mid-point to the second end of the rotary shaft.

19. The method according to claim 15, further comprising rotating the rotary shaft, so that one single pair of feeding blades at the time is active on the hay.

* * * * *